United States Patent
Levy et al.

(10) Patent No.: US 6,826,304 B2
(45) Date of Patent: Nov. 30, 2004

(54) REDUCING HALOS IN SPATIALLY DEPENDENT GAMUT MAPPING

(75) Inventors: Avraham Levy, Kiryat Tivon (IL); Doron Shaked, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 300 days.

(21) Appl. No.: 10/096,303

(22) Filed: Mar. 13, 2002

(65) Prior Publication Data

US 2003/0174884 A1 Sep. 18, 2003

(51) Int. Cl.⁷ .................................................. H04N 1/60
(52) U.S. Cl. ................... 382/167; 382/254; 345/590; 358/1.9; 358/515; 358/517; 358/518; 358/520
(58) Field of Search ................... 382/167, 254; 345/590; 358/1.9, 515, 517, 518, 520

(56) References Cited

U.S. PATENT DOCUMENTS

| | | | |
|---|---|---|---|
| 6,263,120 B1 * | 7/2001 | Matsuoka | 382/300 |
| 6,603,483 B1 * | 8/2003 | Newman | 345/593 |
| 6,646,762 B1 * | 11/2003 | Balasubramanian et al. | 358/1.9 |
| 2002/0154832 A1 * | 10/2002 | Sobol | 382/274 |
| 2003/0030826 A1 * | 2/2003 | Kimmel et al. | 358/1.9 |
| 2003/0063097 A1 * | 4/2003 | Prabhakar et al. | 345/589 |

FOREIGN PATENT DOCUMENTS

| | | | |
|---|---|---|---|
| EP | 1098510 | 5/2001 | H04N/1/60 |
| WO | WO02104002 | 12/2002 | H04N/1/60 |

OTHER PUBLICATIONS

S. Nakauchi et al:"Color Gamut Mapping Based on a Perceptual Image Differences Measure" Color Research and Application vol. 24, No. 4, 1999 pp. 280–291 XP008019226.

Zhang X et al: "A spatial extension of CIELAB for digital color–image reproduction" 1996 SID International Symposium, USA, vol. 5, No. 1 pp. 6–63 XP00246662.

* cited by examiner

*Primary Examiner*—Leo Boudreau
*Assistant Examiner*—Patrick Edwards

(57) ABSTRACT

A method and apparatus for color image processing using gamut mapping reduces halo artifacts by correcting terms in a gamut mapping algorithm. The color image may be represented by $f$, the in gamut image by $g$, the target gamut by $C$, and the gamut constraint by $c$. The method for reducing halo artifacts includes two correction steps. First a color distance term $L_2$ in the gamut mapping algorithm is corrected. Second, a distance measure of an image gradient in the gamut mapping algorithm is corrected. The first correcting step comprises computing a function $u = \text{project}_C(f)$. The second correcting step comprises computing a scaled down function for $f$. Next, a function $g(x,y)$ is determined that minimizes a functional comprising the color distance term and the image gradient term. The solution may be determined by iteration using a gradient descent operation by first initializing $g_0 = \text{project}_C(f)$, and then performing one or more iteration steps to compute $g(x,y)$.

18 Claims, 3 Drawing Sheets

REDUCING HALOS IN SPATIALLY DEPENDENT GAMUT MAPPING

TECHNICAL FIELD

The technical field is color image processing using spatially dependent gamut mapping.

BACKGROUND

Gamut mapping is used to modify a representation of a color image to fit into a constrained color space of a given rendering medium. A laser-jet color printer that attempts to reproduce a color image on regular paper would have to map the photographed picture colors in a given color range, also known as the image "color gamut," into the given printer/page color gamut. Gamut mapping of an original color image may produce unwanted artifacts in the rendered image. One such artifact is referred to as a halo. Halo artifacts occur near edges of objects in the rendered image, and are a consequence of using spatially dependent gamut mapping algorithms to map an original color image onto a constrained color space.

SUMMARY

A method and apparatus for color image processing using gamut mapping reduces halo artifacts by correcting terms in a spatially dependent gamut mapping algorithm. The color image may be represented by f, an in gamut image by g, a general gamut volume by C, and a gamut constraint by c. The method for reducing halo artifacts includes two correction steps. First, a color distance term $L_2$ in the gamut mapping algorithm is corrected. Second, a distance measure of an image gradient in the gamut mapping algorithm is corrected. The first correcting step comprises computing a function u=min(f,c). The second correcting step comprises computing a monotone increasing function $\bar{f}=S(f)$, such that the derivative of S is smaller than unity for high values of $f$. Next, a function g(x,y) is determined that minimizes a functional comprising the color distance term and the image gradient-distance term. The solution may be determined by iteration using a gradient descent operation by first initializing $g_0$=min(f,c) and then performing one or more iteration steps to compute g(x,y).

The apparatus may comprise a suitably programmed processor or other general purpose computer that receives an input image, processes the input image according to the corrected processing routines, and produces an output electrical signal capable of being rendered as a color image on a suitable rendering device such as a color laser printer, for example.

The method may be embodied on a computer readable medium comprising routines for reducing halo artifacts during color image processing using gamut mapping. The computer readable medium may be one of a hard disk, a floppy disk, or other magnetic storage, an optical storage device, or any other computer readable medium.

DESCRIPTION OF THE DRAWINGS

The detailed description will refer to the following drawings in which like numerals refer to like objects, and in which.

DETAILED DESCRIPTION

A variational approach for color image gamut mapping is based on an image difference measure, which is a combination of two terms. The first term is a standard $L_2$ distance measure, aimed at preserving the original colors of the color image. The second term is the $L_2$ distance measure of the image gradient, which preserves the original image variations. This variational approach of color image gamut mapping operates on each color channel, e.g., R, G, and B, separately, and hence can be presented as a one dimensional (1D) approach.

Considering only one color channel, an image S can be represented by a positive, bounded and differentiable function, f(x,y), defined on a bounded domain $\Omega$. To project the representation into a restricted color gamut, which reduces to projecting into a line interval in the 1D case, requires finding a positive and differentiable function g(x,y) that minimizes the functional:

$$\int_\Omega (k*(f-g))^2 \, dxdy + \alpha \int_\Omega (\nabla(k*(f-g)))^2 \, dxdy, \tag{1}$$

subject to $c_l \leq g(x,y) \leq c_h$, where $c_l$ and $c_h$ are constants that describes the 1D target gamut restriction, k(x,y) is a smoothing kernel, and $\alpha$ is a parameter. This minimization problem can be solved by an efficient quadratic programming (QP) iterative method. Quadratic programming methods are well know to those skilled in the art of color image reproduction. To simplify matters, and without loss of generality, the gamut constraint c may be treated as one sided and g(x,y) $\leq$ c.

The variational approach to color image reproduction approach suffers from halo artifacts near image edges. Such halo artifacts are formed because there is no local restriction on the size of the projected image gradient.

Figure 1A:
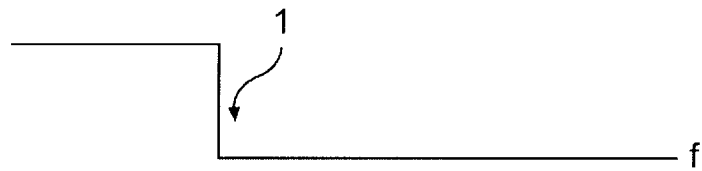
FIGS. 1A-1C illustrate the effect of correcting a gamut mapping algorithm.

A 1D formulation of the gamut mapping problem is used to illustrate a method and apparatus for reducing the halo artifacts. Considering the original image $f$, and its corresponding color gamut, in those points where f(x,y) is larger than the constant c, the gamut constraint g(x,y)$\leq$c ensures that g(x,y) will be smaller than f(x,y). Therefore, the $L_2$ term at such points has a large contribution to equation (1), and g(x,y) is strongly pulled toward the constraint value c. FIG. 1A shows this behavior. In FIG. 1A, c represents the gamut constraint (again, only one gamut constraint need be considered), f represents the original image, and g represents the in-gamut image. As can be seen at point 1 on f, an image edge occurs. The in gamut image g decreases in value as f decreases. When f returns to a constant value, g attempts to reach the value of f (i.e., g approaches c with a positive slope), but is constrained by the gamut constraint c. This behavior creates the halo phenomena near image edges. To reduce this effect, the function k*f in the $L_2$ term is replaced with the function k*min(c,f). The corrected term, $(k*g-k*\min(c,f))^2$, is smaller than the original term, $(k*g-k*f)^2$, at points where f(x,y)>c and hence the halo artifacts are reduced. The corrected formulation is: Find a positive and differentiable function g(x,y) that minimizes the functional:

$$\int_\Omega ((k*\min(f,c) - k*g))^2 \, dxdy + \alpha \int_\Omega |\nabla(k*(f-g))|^2 \, dxdy, \tag{2}$$

subject to g(x,y)$\leq$min(c(x,y), f(x,y)).

Figure 1B:
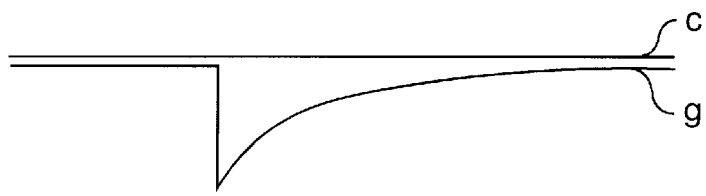

The effect of replacing the function k*f in the $L_2$ term with the function k*min(c,f) can be seen in FIGS. 1A and 1B. After the edge 1 is reached, the value of f decreases sharply to a new, approximately constant value. The value of g also decreases, but instead of attempting to reach the value of k*f as in FIG. 1A, which creates a strong slope due to the distance between g and its target, the new (and closer) target function k*min(c,f) causes g to increase at a much slower rate (smaller slope than shown in FIG. 1A) toward c as shown, thereby reducing halo effects.

The above improvement reduces halo effects by altering the first term in equation (1). However, this improvement is not the only step that can be taken with respect to equation (1) to minimize halo artifacts. The derivative $L_2$ term may also be modified to reduce halo artifacts. For the sake of brevity the derivative $L_2$ term is here called the Sobolev term. Near sharp edges, where $|\nabla f|$ has high values, the Sobolev term causes $|\nabla g|$ to have similarly high values. However if a sharp edge occurs where the function f has higher values than the constant c, the corresponding edge of the in gamut image g should be smaller, otherwise a halo artifact is produced. In order to reduce this second halo effect, the true gradient of f in the Sobolev term may be modified to reduce the gradient of g. This can be achieved, by computing a monotone increasing function $\tilde{f}=S(f)$ such that the derivative of S is always less than unity for high values of $\tilde{f}$. As an example, the function f in the Sobolev term is replaced with a new function $\tilde{f}$:

$$\tilde{f} = \max(f) * \left(\frac{f}{\max(f)}\right)^\gamma,$$

where γ is a parameter greater than 1. The new function $\tilde{f}$ has smaller derivatives at points where f is above C. The new functional is then:

$$\int_\Omega ((k*\min(f,c) - k*g))^2 \, dxdy + \alpha \int_\Omega |\nabla(k*(\tilde{f}-g))|^2 \, dxdy, \quad (3)$$

subject to $g(x,y) \leq \min(c(x,y), \tilde{f}(x,y))$.

Figure 1C:
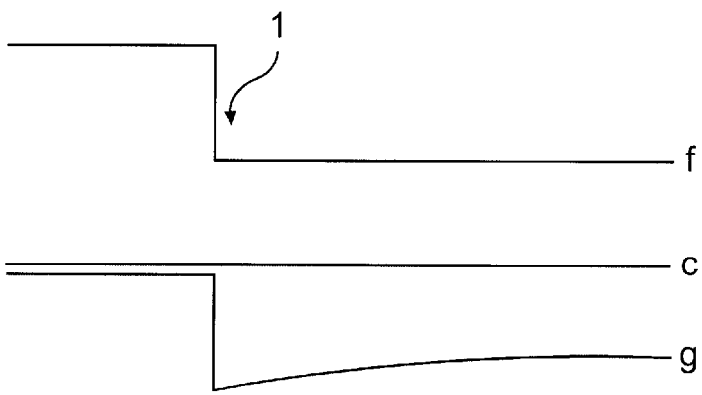

FIG. 1C shows the impact of replacing the function f with the new function $\tilde{f}$. As can be seen, the step decrease behavior of g is now smaller than the behavior shown in FIG. 1A, thereby reducing the halo artifacts that otherwise would have been created at the image edge. Function g* illustrates the expected improvements when the first and second terms in equation (1) are corrected.

Figure 2:
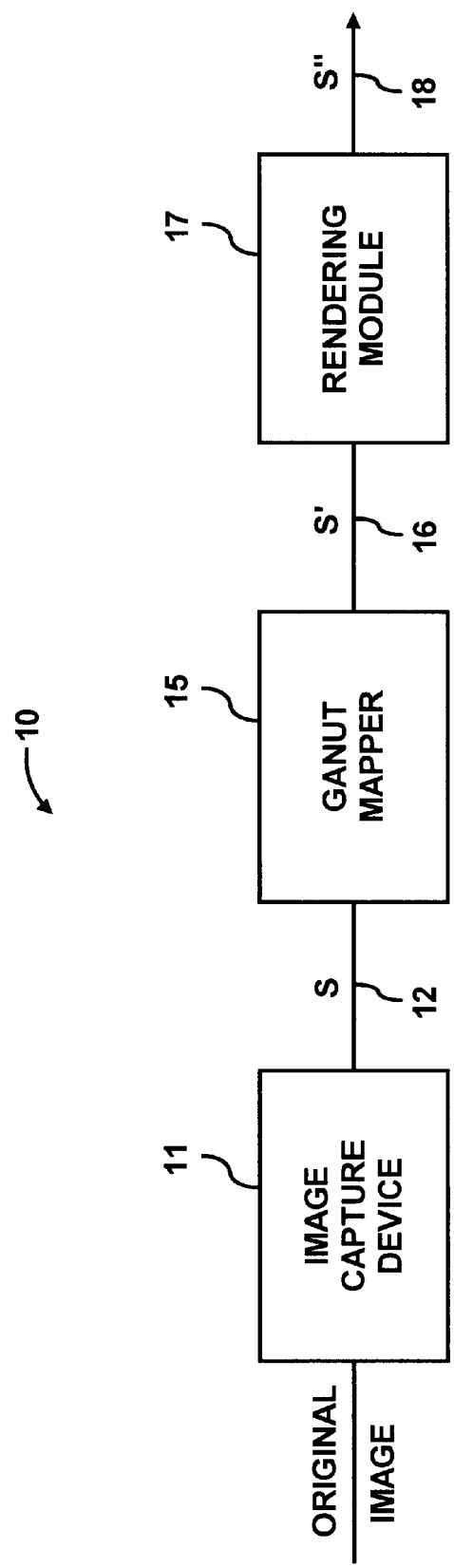
FIG. 2 is a block diagram of an apparatus that uses the corrected gamut mapping algorithm.

FIG. 2 is a block diagram of an apparatus 10 that may be used for gamut mapping according to the functional of Equation (3). An image capture device 11 receives an input original image and produces an output image S 12, which is an electrical signal representing a calorimetric image value. For example, the capture device 11 may convert at least three calorimetric values of each pixel of the original image into corresponding electrical signals. The electrical signals may indicate the L, a, b values, for example. Other colorimetric values may be the XYZ tristimilus value and the L, U, V or device dependent RGB values. A gamut mapper 15 produces an in-gamut image S' 16. Finally, a rendering module 17 provides a rendered image S" 18. The rendering module 17 may be implemented as a color laser printer, for example. The thus-generated image S" 18 may represent a best-fit image, given gamut limitations of the device in which the image reproduction is to occur.

The image S 12 may represent the image as sensed by the capture module 11. The gamut mapper 15 applies an algorithm to extract and map the values of the image S 12 into the gamut of the image reproduction device 17. In particular, the gamut mapper 15 may apply an algorithm that solves the problem represented by equation (3), thereby solving the gamut mapping problem and optimizing the output image S" 18.

Figure 3:
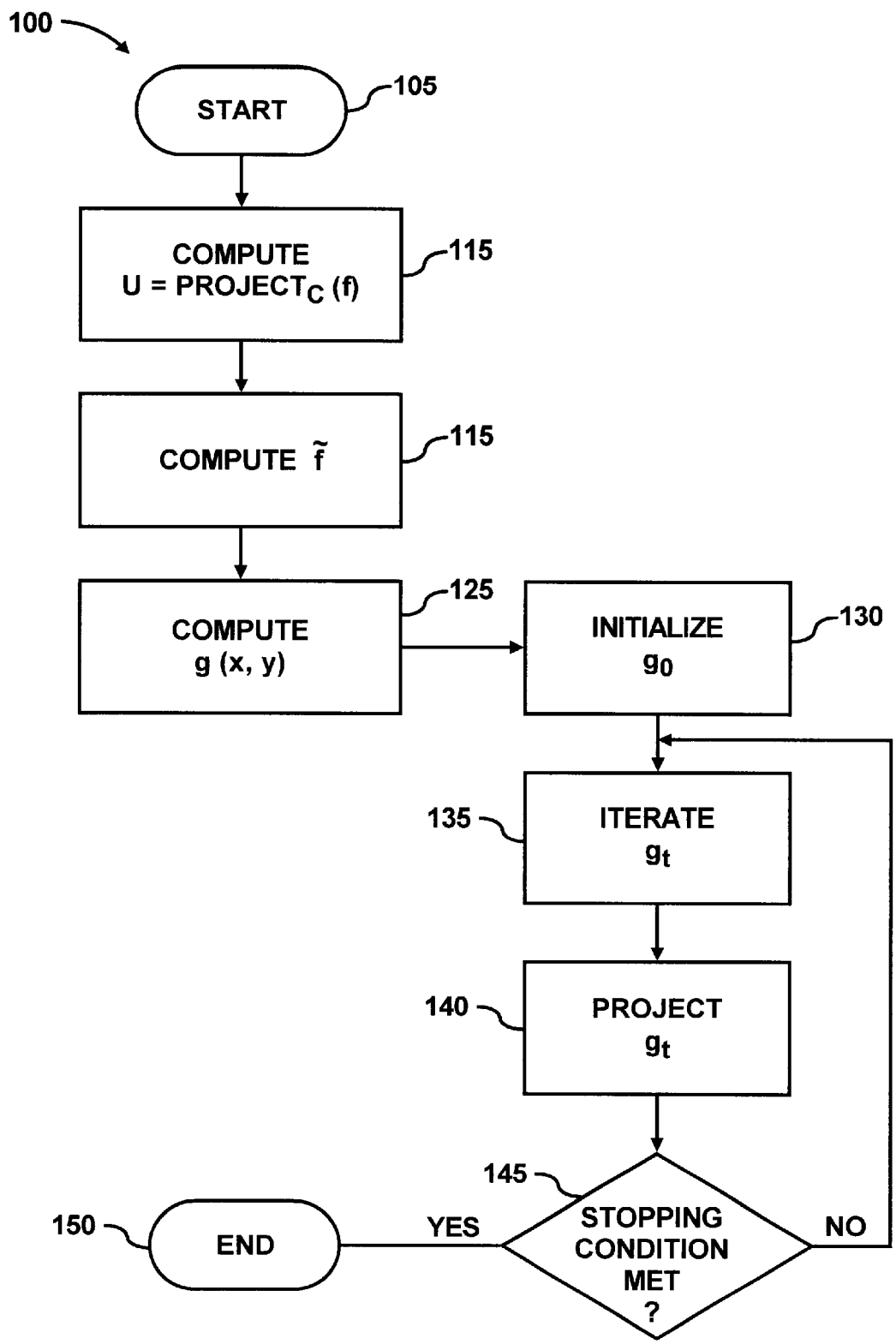
FIG. 3 is a flowchart showing an operation of the gamut mapping algorithm.

FIG. 3 is a flowchart illustrating operation of an algorithm 100 used by the apparatus 10 to produce a rendered color image S" 18 based on an original image S, given an image representation f and a gamut constraint c. The algorithm 100 begins operation in block 105. In block 110, the function $u=\text{project}_C(f)$, where $\text{project}_C(f)$ is a preferred projection method of f onto the general gamut volume C, is computed. Next, in block 115, the function $\tilde{f}=(f)$ is computed. In certain color spaces, $\text{project}_C(f)$ is a minimum operation. Next, the function g(x,y) that minimizes the functional $$\int_\Omega (k*(u-g))^2 \, dxdy + \alpha \int_\Omega (\nabla(k*(\tilde{f}-g)))^2 \, dxdy,$$

subject to $g \leq u$, is determined. The determination of g(x,y) according to the algorithm 100 may be completed by executing subroutine 125.

Subroutine 125 comprises an initialization step: $g_0=\text{project}_C(f)$ (block 130), followed by iteration steps. In block 135, a gradient descent step computation determines a new function $g_t$ according to the Euler-Lagrange equation of equation (3):

$$g_t = g_{t-1} + \tau(-k*(u-g_t) + \alpha k*\Delta(k*(\tilde{f}-g_t))),$$

where τ is a time step constant and Δ is the Laplacian operator. In block 140, a projection step $g_t=\min(g_t,u)$ ensures that this function satisfies the gamut constraint. The subroutine 125 continues the gradient descent projection steps 135 and 140, respectively, until a stopping condition on g(x,y) is achieved in block 145. The optimum function g(x,y) is then the required projected image representation. In block 150, the operation of the algorithm 100 ends.

What is claimed is:

1. A method for reducing halo artifacts during spatially dependent gamut mapping of a color image, comprising:

computing a function $u=\text{project}_C(f)$, wherein f represents the color image, and C is a gamut volume;

computing a monotone increasing function $\tilde{f}=S(f)$ such that the derivative of S is less than unity for high values of $\tilde{f}$; and determining a function g(x,y) that minimizes the functional $$\int_\Omega (k*(u-g))^2 \, dxdy + \alpha \int_\Omega \nabla(k*(\tilde{f}-g))^2 \, dxdy,$$

subject to $g \in C$.

2. The method of claim 1, wherein determining the function g(x,y), comprises:

initializing $g_0=\text{project}_C(f)$; and performing one or more iteration steps to compute g(x,y).

3. The method of claim 2, wherein each of the one or more iteration steps comprises a gradient descent iteration according to:

$$g_t = g_{t-1} + \tau(-k*(u-g_t) + \alpha k*\Delta(k*(\tilde{f}-g_t))),$$

wherein τ is a time step constant and Δ is a Laplacian operator; and projecting $g_t$ onto the gamut volume C.

4. A method for reducing halo artifacts during color image processing using a spatially dependent gamut mapping algorithm, comprising:

first correcting a color distance term in the gamut mapping algorithm;

second correcting a distance measure of an image gradient in the gamut mapping algorithm, wherein the second correcting step comprises computing a monotone increasing function $\tilde{f}=S(f)$ such that the derivative of S is less than unity for high values $f$, wherein $f$ represents the color image; and determining a function g(x,y) that minimizes the functional $$\int_\Omega (k*(u-g))^2\, dxdy + \alpha \int_\Omega \left(\nabla\left(k*(\tilde{f}-g)\right)\right)^2 dxdy,$$

subject to g∈C.

5. The method of claim 4, wherein the first correcting step comprises computing a function u=project$_C(f)$, wherein C is a gamut volume.

6. The method of claim 4, wherein determining the function g(x,y), comprises:

initializing $g_0$=project$_C(f)$ and performing one or more iteration steps to compute g(x,y).

7. The method of claim 6, wherein each of the one or more iteration steps comprises a gradient descent iteration.

8. A computer readable medium comprising routines for reducing halo artifacts during color image processing using spatially dependent gamut mapping, the routines comprising:

computing a function u=project$_C(f)$, wherein f represents the color image, C is a target gamut, and c is a gamut constraint;

computing a monotone increasing function $\tilde{f}=S(f)$ such that the derivative of S is less than unity for high values of $f$; and determining a function g(x,y) that minimizes the functional $$\int_\Omega (k*(u-g))^2\, dxdy + \alpha \int_\Omega \left(\nabla\left(k*(\tilde{f}-g)\right)\right)^2 dxdy,$$

subject to g∈C.

9. The computer readable medium of claim 8, wherein determining the function g(x,y), comprises:

initializing $g_0$=project$_C(f)$; and performing one or more iteration steps to compute g(x,y).

10. The method of claim 9, wherein each of the one or more iteration steps comprises a gradient descent iteration according to:

$g_t = g_{t-1} + \tau(-k*(u-g_t) + \alpha k*\Delta(k*(\tilde{f}-g_t)))$, where 96 is a time step constant and Δ is a Laplacian operator; and projecting $g_t$ onto the target gamut C.

11. An apparatus that reduces halo artifacts in an image rendered using spatially dependent gamut mapping models, comprising:

an image capture device, wherein an original color image is received, and wherein the original image is represented by a function f;

a gamut mapper, wherein the received color image is transformed and projected onto a target gamut, the target gamut C having a constraint c, the gamut mapper comprising programming for:

computing a function u=project$_C(f)$, computing a monotone increasing function $1=S(f)$ such that the derivative of S is less than unity for high values of $f$, and determining a function g(x,y) that minimizes the functional $$\int_\Omega (k*(u-g))^2\, dxdy + \alpha \int_\Omega \left(\nabla\left(k*(\tilde{f}-g)\right)\right)^2 dxdy,$$

subject to g∈C.

12. The apparatus of claim 11, wherein the gamut mapper further comprises programming for:

initializing $g_0$=project$_C(f)$; and performing one or more iteration steps to compute g(x,y).

13. The apparatus of claim 12, wherein each of the one or more iteration steps comprises a gradient descent iteration according to:

$g_t = g_{t-1} + \tau(-k*(u-g_t) + \alpha k*\Delta(k*(\tilde{f}-g_t)))$, wherein τ is a time step constant and Δ is a Laplacian operator.

14. The apparatus of claim 11, wherein the gamut mapper produces a projected image on the target gamut C.

15. The apparatus of claim 14, further comprising a rendering device that transforms the projected image into a color space of the original image.

16. An apparatus for reducing halo artifacts in a rendered color image, comprising:

means for capturing an original color image, the original color image $f$ having a defined color space;

first means for transforming the original color image into a transform color space;

means, coupled to the transforming means, for mapping the transformed color image onto a target gamut C, whereby a projected image is produced wherein the means for mapping comprises: means for computing a function u=project$_C(f)$; means for computing a monotone increasing function $\tilde{f}=S(f)$ such that the derivative of S is less than unity for high values of $f$, and means for determining a function g(x,y) that minimizes the functional;

$$\int_\Omega (k*(u-g))^2\, dxdy + \alpha \int_\Omega \left(\nabla\left(k*(\tilde{f}-g)\right)\right)^2 dxdy,$$

second means, coupled to the mapping means, for transforming the projected image into the defined color space; and means for rendering the transformed projected image.

17. The apparatus of claim 16, wherein the mapping means further comprises:

means for initializing $g_0$=project$_C(f)$, and means for performing one or more iteration steps to compute g(x,y).

18. The apparatus of claim 17, wherein each of the one or more iteration steps comprises a gradient descent iteration according to:

$g_t = g_{t-1} + \tau(-k*(u-g_t) + \alpha k*\Delta(k*(\tilde{f}-g_t)))$, wherein τ is a time step constant and Δ is a Laplacian operator; and projecting $g_t$ onto the target gamut C.

* * * * *